United States Patent Office 3,058,569
Patented Oct. 16, 1962

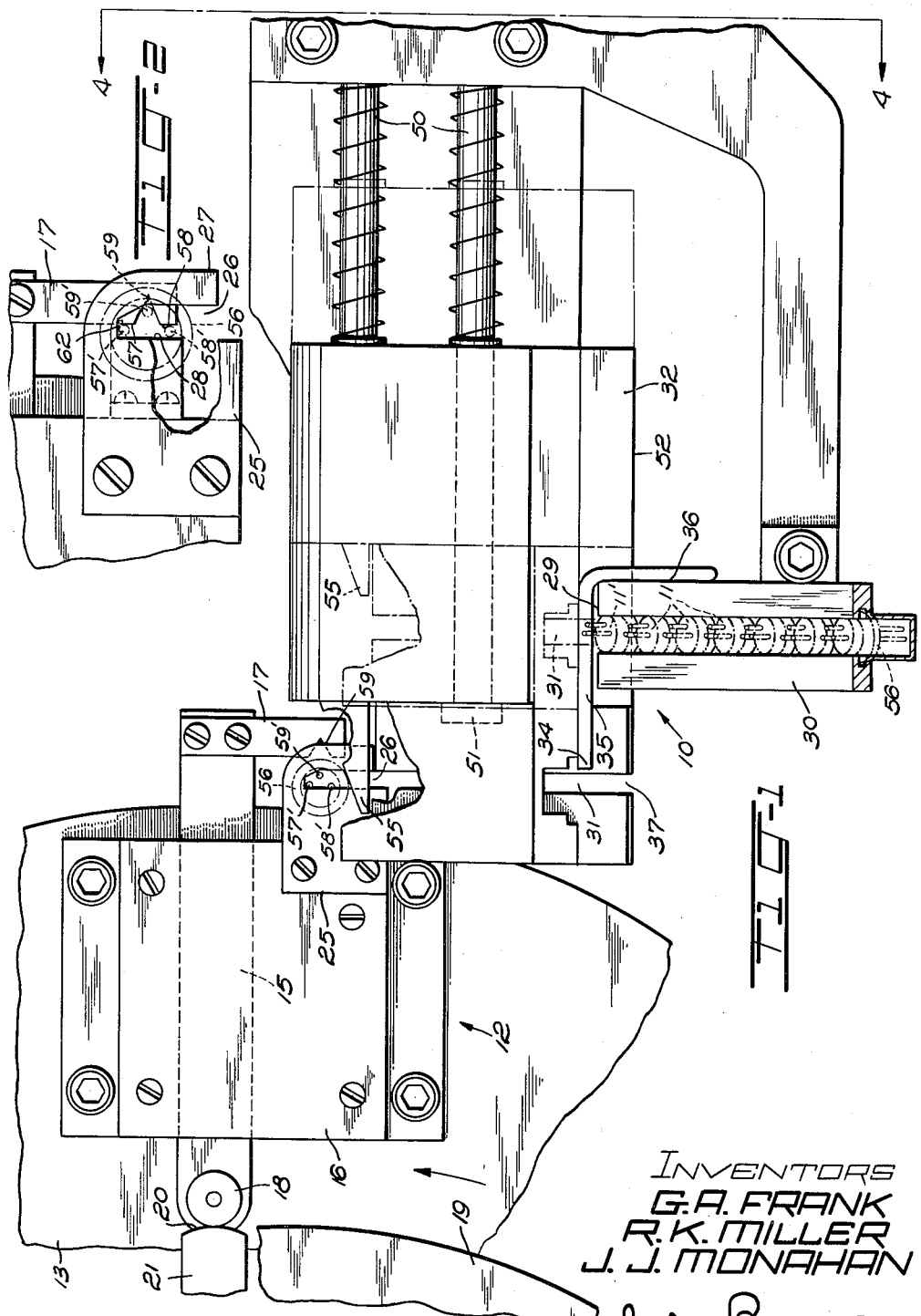

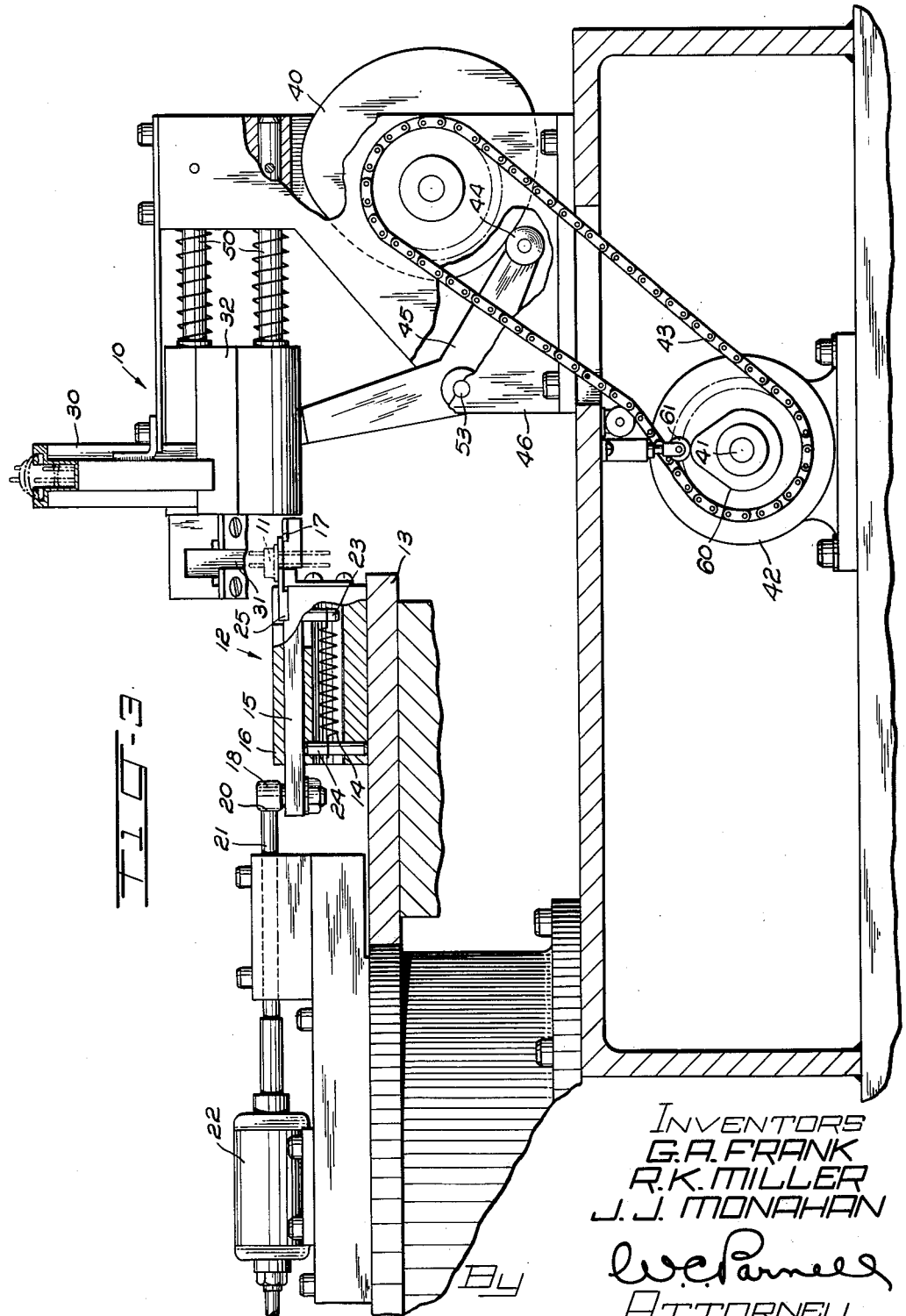

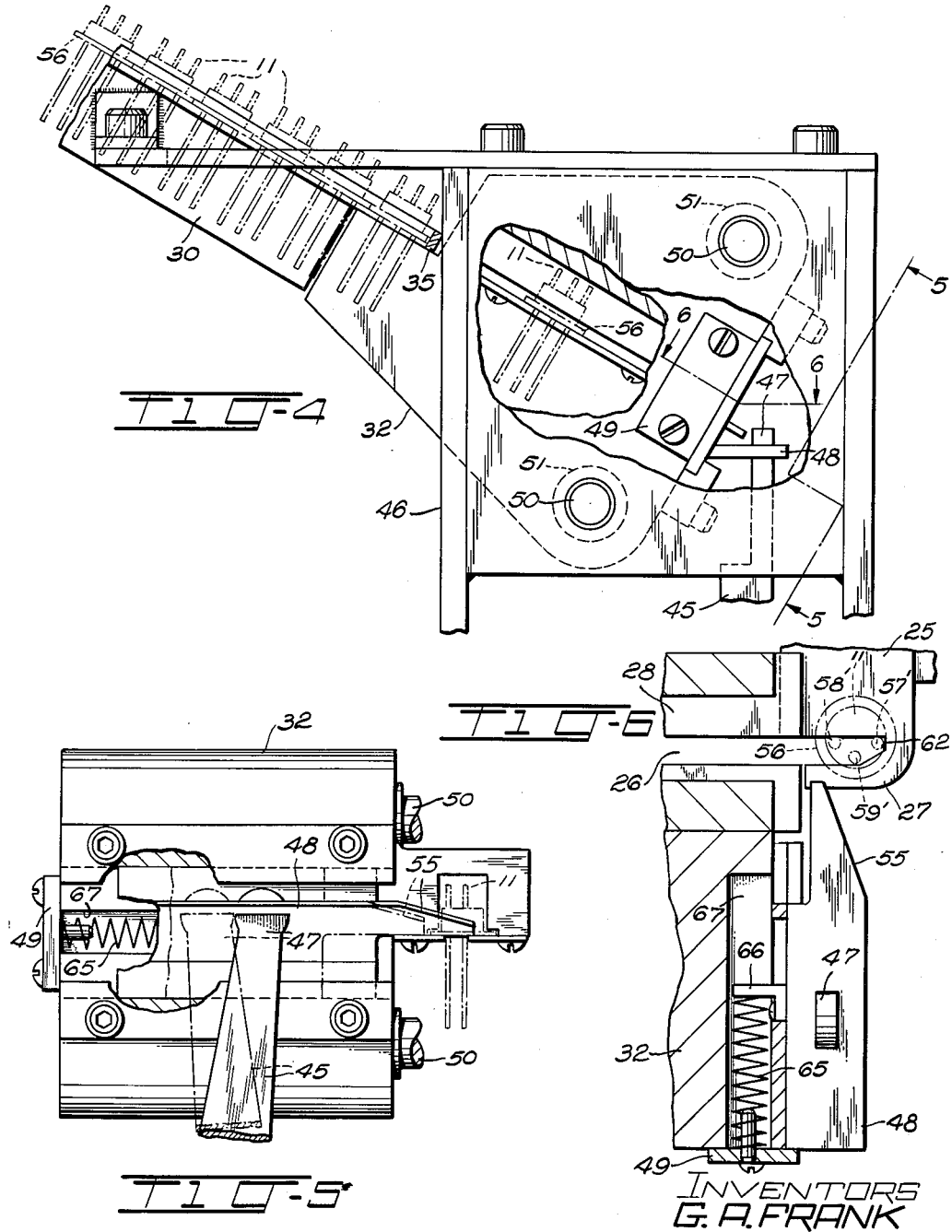

3,058,569
ARTICLE FEEDING APPARATUS
Gerard A. Frank, Robert K. Miller, and Jack J. Monahan, Allentown, Pa., assignors to Western Electric Company, Incorporated, New York, N.Y., a corporation of New York
Filed Jan. 25, 1961, Ser. No. 84,819
7 Claims. (Cl. 198—26)

This invention relates to apparatus for feeding articles and particularly to apparatus for feeding and securing articles to a workholder.

Heretofore, in the manufacture of articles such as transistor headers generally comprising a plurality of leads extending through and attached at one point to a body portion, manual operations were required to complete the assembly of the transistor. Due to the great demand for transistors, manual assembly requires many skilled operators and time consuming operations. Consequently, an assembly machine has been designed for performing many of these manual operations and includes apparatus for initially feeding the headers to workholders which convey the heads to various operating stations.

The object of this invention is an apparatus for automatically feeding article, such as transistor headers, to a predetermined position in a workholder. Another object of this invention is an apparatus for automatically securing articles, such as transistor headers, located in a predetermined position of a workholder.

In one embodiment of the invention as applied to an apparatus for feeding and securing headers in a predetermined position of a workholder, the headers are received one at a time from an inclined chute onto a feed track of a reciprocatable carriage moving transversely past the chute. As the carriage is moved to an advanced position, the header is held in the feed track by a retaining member extending transversely in the path of the track while a portion of the carriage blocks the succeeding headers in the chute. When the carriage is in the advanced position, the feed track is clear of the retaining member and the header drops down the feed track into a recess of a workholder, the feed track being in alignment with the recess in the advanced position. A wedging element is automatically actuated to move and locate the header in a predetermined position of the recess and a clamp is closed to secure the header.

Other objects will be apparent and a fuller understanding of the invention may be had by referring to the following description and claims, taken in conjunction with the accompanying drawing, in which:

FIG. 1 is a plan view of the apparatus showing the carriage in its advanced position and the clamping element in the open position;

FIG. 2 is an enlarged fragmentary view of the clamping element in the closed position;

FIG. 3 is a side elevational view of the apparatus;

FIG. 4 is a sectional view of the apparatus taken along the line 4—4 of FIG. 1;

FIG. 5 is a sectional view taken along the line 5—5 of FIG. 4; and

FIG. 6 is a sectional view taken along the line 6—6 of FIG. 4.

With regard to FIGS. 1 and 2 of the drawing, the invention is incorporated in a feeding mechanism 10 for feeding individual headers 11 to a jig 12. The jig is mounted on a turret 13 which is rotated by conventional drive means (not shown) to index the jig to a predetermined position with respect to the feeding mechanism for receiving the headers.

A spring loaded reciprocatable lever 15 extends through and is supported within the pig housing 16. The lever 15 has a clamping element 17 at one end for securely holding the header in the jig and a roller 18 is provided on the other end of the lever 15. As the jig is indexed, the roller engages a stationary, arcuately shaped cam 19 which extends over the turret 13 in the path of the jig, causing the lever to advance and locate the clamping element 17 to its open position. A spring 14 connected at one end to a pin 23 on the clamping element and at the other end to a fixed pin 24 is opened as the clamping element is advanced. At the end of the indexing movement, roller 18, as seen in FIGS. 1 and 3, is positioned in front of and contacts the end portion 20 of a piston rod 21 normally extending from air cylindner 22 to retain the clamping element 17 in its open position during the feeding of a header.

A J-shaped nest 25, as seen in FIGS. 1, 2 and 6, is connected to the jig housing 16 and has a recessed portion 26 defined by a short leg 27 and a long leg 28 for receiving a header. The nest 25 is positioned over the clamping element 17 such that the recessed portion 26 is free to receive a header when the clamp is in the open position (FIG. 1).

The feeding mechanism 10 includes a stationary, inclined chute 30 for conveying the headers 11 to a feed track 31 extending through a reciprocatable carriage 32. When the carriage is in the retracted feed position, as seen in phantom in FIG. 1, the carriage feed track 31 is in alignment with chute 30 to accept a single header therefrom; that is, the forewardmost header 11'. A stop 35 is connected to the chute at 36 and extends transversely past the entrance end 37 of carriage feed track 31. The distance between stop 35 and entrance end 37 is such to accommodate a single header in the carriage feed track. Thus, when carriage 32 is in the retracted position, chute 30 is in alignment with feed track 31 to permit the forewardmost header to drop into the track, the movement of the header being arrested by stop 35.

The carriage is advanced transversely past chute 30 by means of a cam 40, FIG. 3, driven by main drive shaft 41 of motor 42 through sprocket 43. Cam 40 has a cam follower 44 which is connected to one end of a drive lever 45, pivotally connected at 53 to a support 46. As seen in FIGS. 5 and 6, the other end 47 of lever 45 is connected to a spring loaded drive member 48, adjoining carriage 32 by means of a locking plate 49.

The carriage moves along guide rods 50 past chute 30 towards its advanced position until it strikes stop members 51 near the ends of rods 50. During this movement, the edge portion 52 of carriage 32 passes transversely past the exit end 29 of chute 30 to block the second and succeeding headers in the chute. However, it is noted that separate means can be connected to or placed near the carriage to block the succeeding headers. At the same time, carriage feed track 31 carries the header along stop 35 until carriage 32 reaches its advanced position. The feed track 31 is then in alignment with the recess 26 of jig nest 25 and sufficiently clear of stop end portion 34 so that the header is free to slide down the feed track into the recess.

As seen in FIGS. 5 and 6, drive member 48 is connected to a spring unit 65 via element 66, the spring unit and element being located within a slotted portion 67 of the carriage to permit additional movement of the drive member. Thus, when the carriage is momentarily at rest in the advanced position, lever 45 continues to move in its arcuate path and advances drive member 48 forward a short distance. In so doing, a wedge-shaped head 55 on the end of member 48 engages and pushes the header disc portion 56 towards the end of the recessed portion 26; that is, until lead 57' engages the junction 62 of nest legs 27 and 28, which is the desired oriented position of the header. It is noted, however, that while drive member 48 is preferable for orienting the header, other type means can be used, such as, a magnet located near junction 62 or a pneumatic device discharging an air current against the header to push and hold it at the end of the recessed portion 26.

The header is held snugly in its nest by the wedge-shaped head until a cam 60 on drive shaft 41 strikes microswitch 61 to actuate air cylinder 22. Piston rod 21 is retracted and lever 15 is released allowing clamping element 17 to close and secure the header, as seen in FIG. 2. The clamp engaging surfaces 57 and 58 exert a force on leads 57' and 58', the leads contacting the long leg 28 of the nest. The header is positively located and secured in the nest due to the exertion of a horizontal and vertical force on lead 57' against junction 62, and a horizontal force on lead 58' against the long leg 28 of the nest. A grooved portion 59 on clamping element 17 prevents contact with lead 59' and possible injury thereto as no surface area is located on the other side of the lead to receive the thrust of the clamp.

During the clamping of the header leads, carriage 32 returns to its retracted position, picking up another header. The turret is rotated to advance the loaded jig to a succeeding station and an unloaded jig is moved into the header receiving position. The apparatus is now ready to commence another cycle.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. Apparatus for feeding an article to a recessed portion of a workholder, which comprises the combination of means for holding a supply of articles, a reciprocatable carriage movable with respect to the article holding means between retracted and advanced positions, a feed track in the carriage axially alignable with the holding means when the carriage is in the retracted position for receiving the foremost article from the holding means, a fixed retaining member transversely extending over a portion of the feed track for retaining the foremost article in the track in the retracted position and during the advancement of the carriage towards the recessed portion, drive means for moving the carriage, and means on the carriage for blocking the succeeding articles in the holding means during movement of the carriage to its advanced position, the carriage feed track being in axial alignment with the recessed portion of the workholder in the advanced position for feeding the foremost article thereto.

2. Apparatus for feeding an article to and accurately positioning the article in a recessed portion of a workholder, which comprises the combination of means for holding a supply of articles, a reciprocatable carriage movable with respect to the article holding means from retracted and advanced positions, a feed track in the carriage alignable with the holding means when the carriage is in the retracted position for receiving the foremost article from the holding means, a fixed retaining member for retaining the foremost article in the track in the retracted position and during the advancement of the carriage towards the recessed portion, drive means for moving the carriage, means on the carriage for blocking the succeeding articles in the holding means during movement of the carriage to its advanced position, the carriage feed track being in alignment with the recessed portion of the workholder in the advanced position for feeding the foremost article thereto, and means connected to the drive means for accurately positioning the foremost article in a predetermined position of the recessed portion.

3. Apparatus for feeding and securing an article in a recessed portion of a workholder, which comprises the combination of means for holding a supply of articles, a reciprocatable carriage movable with respect to the article holding means from retracted and advanced positions, a feed track in the carriage alignable with the holding means when the carriage is in the retracted position for receiving the foremost article from the holding means, a fixed retaining member for retaining the foremost article in the track in the retracted position and during the advancement of the carriage towards the recessed portion, drive means for moving the carriage, means on the carriage for blocking the succeeding articles in the holding means during movement of the carriage to its advanced position, the carriage feed track being in alignment with the recessed portion in the advanced position of the workholder for feeding the foremost article thereto, means connected to the drive means for accurately positioning the foremost article in a predetermined position of the recessed portion, a clamping element supported on the workholder, means responsive to the drive means for actuating the clamping element to secure the article in the predetermined position of the workholder, and means for releasing the article positioning means.

4. Apparatus according to claim 3 in which the clamping element is spring loaded and the actuating means for the clamping element comprises a pressurized fluid operated cylinder, a piston rod normally extending from the cylinder whose end portion contacts and forces the clamping element to an advanced open position, and a switch operated by the drive means for activating the cylinder to withdraw the piston rod into the chamber, to permit the clamping element to retract to engage and secure the article in the workholder.

5. Apparatus according to claim 3 for feeding an article having at least two leads in contact with one wall of the recessed portion and at least one lead positioned along a line perpendicular to the wall extending between the two leads, the clamping element having a pair of lead engaging surfaces for holding the two leads against the wall, and a grooved portion between the two surfaces for clearing said one lead.

6. Apparatus for feeding and accurately positioning a transistor header having at least two leads extending through a body portion in a recess of a workholder, which comprises the combination of, an inclined chute for holding a supply of headers, a reciprocatable carriage movable transversely with respect to the chute from retracted and advanced positions, a feed track extending through the carriage and alignable with the chute when the carriage is in the retracted position, a retaining member connected to the chute and extending transversely past the entrance end of the track for retaining the foremost header in the track in the retracted position and during the advancement of the carriage towards the recess, drive means for moving the carriage, an element connected to the carriage for blocking the succeeding headers in the chute during the movement of the carriage to its advanced position, the carriage feed track being in alignment with the recess in the advanced position for feeding the foremost header in the chute thereto, an element connected to the drive means and having a wedge-shaped head portion for contacting the header body portion so that one lead is positioned against a side wall of the recess and the other lead is wedged at the junction of said side wall and an end wall, a member having one end connected to the element and the other end resiliently connected to the carriage, the member being movable within a slotted portion of the carriage to permit movement of the element when the carriage is at rest in the advanced position, a spring-loaded clamping element supported on the workholder and movable from unclamped to clamped positions, a pressurized, fluid-operated cylinder adjacent the workholder, a piston rod normally extending from the cylinder whose end portion engages and forces the clamping element to an unclamped position, lead engaging surfaces on the element, a switch operated by the drive means for activating the cylinder to withdraw the piston rod from the clamping element, the element retracting to the clamped position so that the engaging surfaces secure the two leads against said recess walls, and means responsive to the drive means for releasing the wedge-shaped element from the header.

7. Apparatus for feeding an article to and accurately positioning the article in a recessed portion of a workholder, which comprises the combination of means for holding a supply of articles, a reciprocatable carriage movable with respect to the article holding means from retracted and advanced positions, a feed track in the carriage alignable with the holding means when the carriage is in the retracted position for receiving the foremost article from the holding means, a fixed retaining member for retaining the foremost article in the track in the retracted position and during the advancement of the carriage towards the recessed portion, drive means for moving the carriage, means on the carriage for blocking the succeeding articles in the holding means during movement of the carriage to its advanced position, the carriage feed track being in alignment with the recessed portion of the workholder in the advanced position for feeding the foremost article thereto, an element having a wedge-shaped head portion connected to the drive means for contacting and wedging the article against the end wall of the recessed portion, and a member having one end connected to the element and the other end resiliently connected to the carriage, the member and element being movable with respect to the carriage when the carriage is at rest in the advanced position.

References Cited in the file of this patent

UNITED STATES PATENTS 2,950,671    Allen ------------------ Aug. 30, 1960